United States Patent [19]

Sidi et al.

[11] Patent Number: 4,956,768

[45] Date of Patent: Sep. 11, 1990

[54] WIDEBAND SERVER, IN PARTICULAR FOR TRANSMITTING MUSIC OR IMAGES

[75] Inventors: Jean A. Sidi, Saint Martin de Londres; Claude B. Nogrady, Montpellier, France

[73] Assignee: Etat Francais, Centre National d'Etudes des Telecommunications, Paris, France

[21] Appl. No.: 159,767

[22] Filed: Feb. 24, 1988

[30] Foreign Application Priority Data

Feb. 25, 1987 [FR] France ................................ 8702514

[51] Int. Cl.[5] .......................... G06F 3/00; G06F 3/14; G06F 15/20

[52] U.S. Cl. ................................ 364/200; 364/239.5; 364/939.1

[58] Field of Search ............... 358/147, 86, 85; 375/7; 370/3; 364/200 MS File, 900 MS File

[56] References Cited

U.S. PATENT DOCUMENTS

| | | | |
|---|---|---|---|
| 4,333,143 | 6/1982 | Calder | 364/200 |
| 4,424,572 | 1/1984 | Lorig et al. | 364/900 |
| 4,454,593 | 6/1984 | Fleming et al. | 364/900 |
| 4,528,643 | 7/1985 | Freeny, Jr. | 364/900 |
| 4,591,973 | 5/1986 | Ferris, III et al. | 364/200 |
| 4,667,286 | 5/1987 | Young et al. | 364/200 |
| 4,787,063 | 11/1988 | Muguet | 364/900 |
| 4,789,895 | 12/1988 | Mustafa et al. | 358/147 |

OTHER PUBLICATIONS

Symposium Record CATV Sessings, juin 1985, pp. 438–445, Montreux; H. Seguin: "Progressive Introduction of New Services in a Broadband Network"* En entier*.

*Primary Examiner*—Gareth D. Shaw
*Assistant Examiner*—Gopal C. Ray
*Attorney, Agent, or Firm*—Staas & Halsey

[57] ABSTRACT

A wideband server is defined by a main processor (10) communicating over a DMA channel (15) with a hard disk (16) and also with outlet cards (2-1 to 2-16). Each outlet card has its own processor which controls alternating mode to-processor access to two buffer memories A and B. While one of the buffer memories is delivering musical data to a user, the other is being filled, and vice versa.

14 Claims, 5 Drawing Sheets

WIDEBAND SERVER, IN PARTICULAR FOR TRANSMITTING MUSIC OR IMAGES

The invention relates to telematics, in particular to video communications networks, and to integrated service digital networks.

BACKGROUND OF THE INVENTION

It is advantageous, for example, to be able to transmit new disks which have been released during the month in high-fidelity sound. A similar problem can arise for transmitting new images.

Means for permanently archiving data currently exist, e.g. non-erasurable digital optical disks (write once, read many or "WORM"), compact disks (or "CD ROM"), or "audio" compact disks. It is difficult to see how monthly issues of new releases can be demonstrated by distributing such storage media.

The aim of the present invention is to enable such distribution to take place using a system which can be rerecorded n times, such as one or more magnetic disks.

The problem is thus one of delivering bulk data in real time, at a rate which may be as much as 768 kilobits per second, and this distribution is to be performed simultaneously for a fairly high number of simultaneous users, for example at least 16 consultation stations It is also necessary for the system to be capable of handling several gigabytes of mass memory.

Computer servers are already known. In such servers, a computer searches through data in a mass memory such as a magnetic disk or an optical disk and then transmits the data over one or more outlets, causing said data to transit through its own registers or central memory.

Using such a server, the theoretical speed limit for processing data is equal to about one half of the maximum bus speed. In practice, the speed is much less than that since the bus must also convey communications between the processor and its peripherals.

For example, in order to process 16 outlets at a rate of 384 kilobits per second, it would be necessary to have a bus operating at least 2 megabytes per second, and such buses are to be found only in very large and very expensive systems. This explains why the market for servers, and in particular for multi-outlet servers, does not provide a server having the capacity to deliver information at 384 kilobits per second, for example.

Preferred embodiments of the present invention provide a solution to this problem by proposing a multi-outlet server of novel structure which is suitable for operating over a wide band, i.e. at a high transmission rate.

SUMMARY OF THE INVENTION

The proposed apparatus comprises, in combination:

a main processor possessing a direct memory access (DMA) channel;

a large capacity mass memory of the hard disk type, connected to said direct memory access channel; and a plurality of outlet units, likewise connected to the direct memory access channel and each possessing two buffer memories of equal capacity, said buffer memories being dual-access memories operated in alternating mode by an auxiliary processor suitable for emptying said memories in alternation and without discontinuity, while simultaneously enabling that one of the two buffer memories which is not being read from to be simultaneously filled at high speed with new data.

In a particular embodiment, the buffer memories have a capacity of 128 kilobytes each, and are controlled by a 16-bit processor clocked at 8 MHz.

The main processor is a 16-bit processor clocked at 8 MHz, and it manages a catalog situated on at least one of the hard disks of the mass memory (preferably on each hard disk when there are several of them). These hard disks have a head positioning time of not more than about 25 milliseconds (for 16 outlets), in conjunction with a read speed of about 2 megabytes per second. This enables 128 kilobytes to be loaded into a buffer memory in less than 0.15 seconds. It is then possible for 16 outlet units to be processed without discontinuity, with each of said units delivering their respective data at a little more than 48 kilobytes per second, thus providing 384 kilobits of sound per second.

The output data may be converted into analog form either immediately, or else after being transmitted over a suitable link.

According to another aspect of the invention, a serial interface is provided enabling the main processor to receive data for storage in the mass memory, said storage taking place in distributed form, taking account of the capacity of the buffer memories. This data for storage advantageously comes from a general server center, via a high speed digital network or via a satellite.

In the preferred application, the outlet units are connected to consultation stations having audio and video outputs, such as speakers or headphones, and a television monitor, enabling music to be listened to or images to be displayed in response to requests received from terminals included in the consultation stations.

In particular, the consultation stations may be associated with interrogation means, in particular Minitels, enabling a piece of music or a set of images to be selected from the wideband server, which wideband server is associated with a multi-outlet telematics server for processing the selection data.

BRIEF DESCRIPTION OF THE DRAWINGS

An embodiment of the invention is described by way of example with reference to the accompanying drawings, in which.

For the most part, the accompanying drawings include information which is definitive in nature. Consequently, they may serve not only to facilitate understanding the following detailed description, but also to contribute to the definition of the invention, where appropriate.

MORE DETAILED DESCRIPTION

Figure 1:
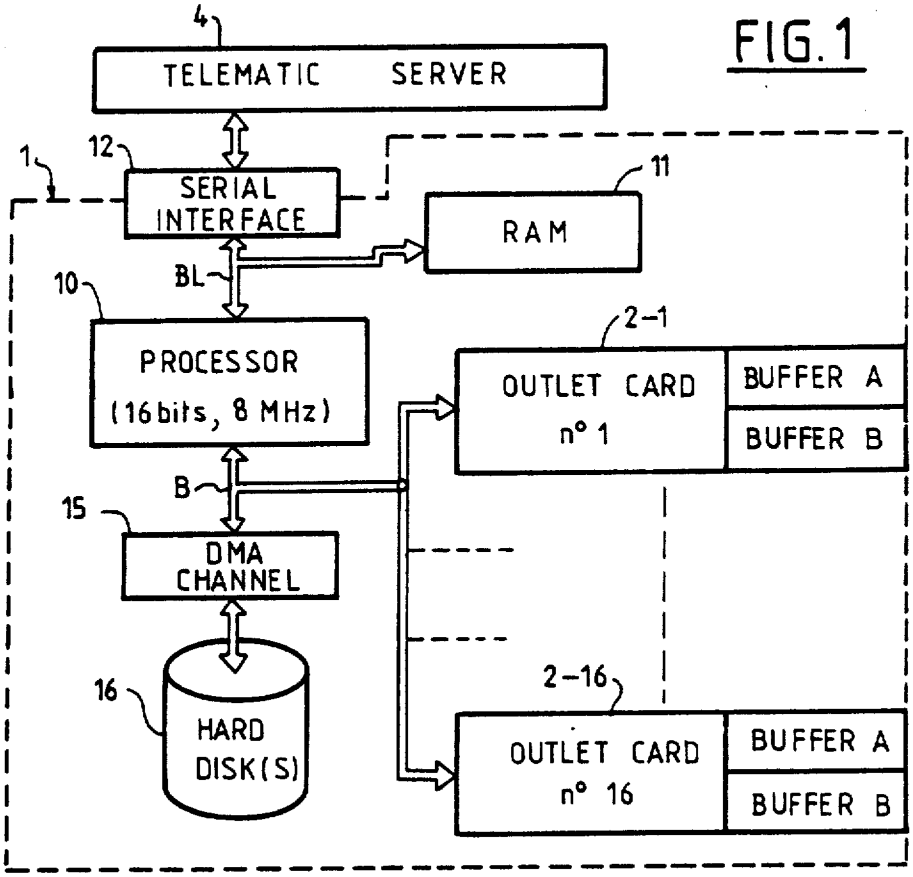
FIG. 1 is a block diagram of a wideband server in accordance with the invention.

In FIG. 1, a wideband server SLB is situated in the dashed line box referenced 1.

It comprises a main processor 10 operating on 16-bit words and clocked at 8 MHz. The processor 10 has a local bus BL which communicates with working memory 11, a program memory (not shown), and a serial interface 12. Naturally other devices may also be provided.

The serial interface 12 is connected to a telematic server 4 which is described in greater detail below.

The processor 10 is also in communication over a link B with a direct memory access channel (DMA channel) referenced 15. The DMA channel enables the processor 10 to manage one or more large capacity hard disks 16. The processor is also connected to a set of outlet cards 2-1 to 2-16 for serving 16 consultation stations in this case, i.e. for serving 16 users.

Figure 2:
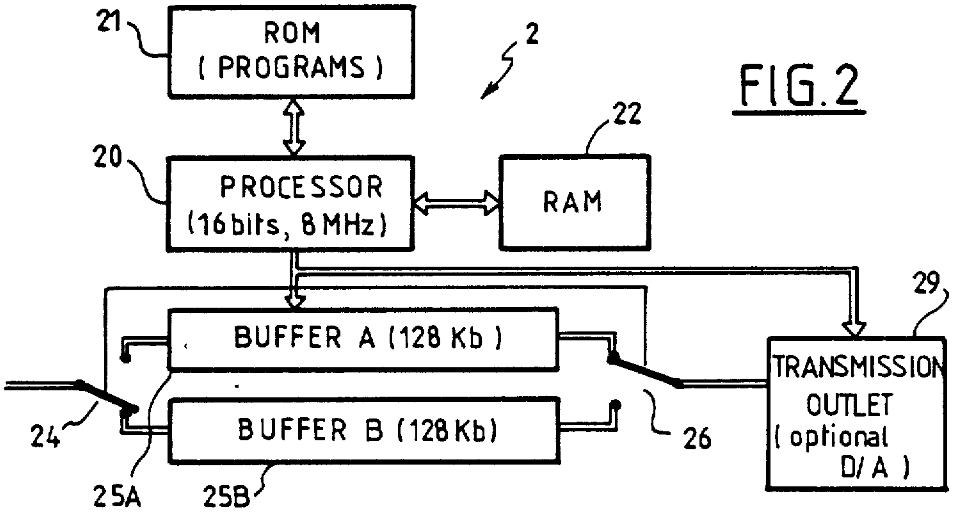
FIG. 2 is a block diagram of an outlet card or unit of the FIG. 1 server.

FIG. 2 is a diagram of one of the cards 2.

Each of these cards comprises a processor 20 which is likewise a 16-bit word machine clocked at 8 MHz. It is provided with a read only program memory 21 and a working memory 22.

The essential function of the processor 20 is to control two buffer memories 25A and 25B, each having a capacity of 128 kilobytes.

As represented by input and output switches 24 and 26, these two memories operate in alternation, i.e. when buffer memory 25A is delivering data to the outlet, the processor 20 ensures that it is impossible to write data into said memory 25A. Meanwhile, data may be written into the other buffer memory 25B. This situation is swapped over when the switches 24 and 26 change state.

Further, the buffer memories 25A and 25B are dual-access memories, i.e. they can be controlled not only by the processor 20 mounted on the same outlet card, but also by the main processor 10.

It is assumed that such dual-access operation is known to the person skilled in the art. The means per se necessary for providing the dual access are not shown, and the switches 24 and 26 constitute a diagrammatic representation thereof.

It is merely specified that alternation between the two buffer memories 25A and 25B is entirely under the control of the local processor 20 on the corresponding outlet card.

The stage represented by box 29 recalls the fact that digital-to-analog conversion may be performed at once. Alternatively the data may be transmitted either to a local consultation station or else over a link to a distant consultation station.

The main processor 10 provides the essential function of managing the catalog of the hard disk(s) 16. If there are several hard disks, it is preferable for each of them to have its own catalog thereon.

The way the catalog is defined is explained further on.

One of the starting points of the invention is the following observation: the main processor is only required to perform elementary instructions of the following types:

fetching data from a first point; and outputting data to a second point.

To do this, there is absolutely no point in using a sophisticated central processor including an instruction set of several hundred instructions, for example a processor of the type generally to be found in systems having a 2 megabyte per second bus. A simple processor of the type used in a general purpose microcomputer, or a reduced instruction set processor is far more suitable.

Figure 3:
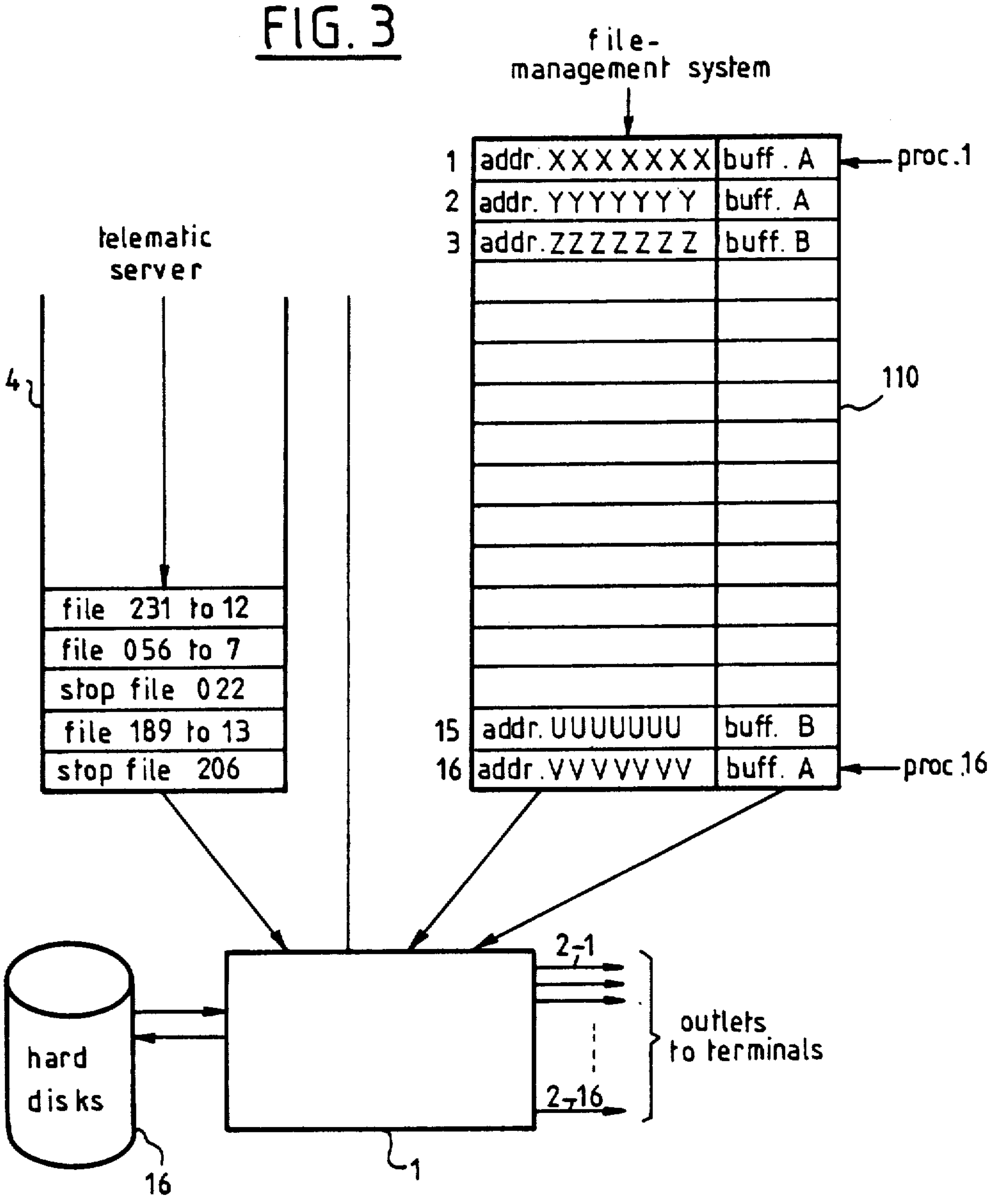
FIG. 3 is an operating diagram showing how a wideband server in accordance with the invention operates.

This will be better understood from examining FIG. 3, where reference 1 indicates the wideband server SLB (except insofar as its hard disks 16 and its outlets to the terminals are shown separately, which outlets have been given the same reference numbers as the corresponding outlet cards).

FIG. 3 also shows data coming from the telematic server 4. Also, at 110, it shows the file management system which the wideband server 1 needs to have.

By way of concrete example, imagine that the server is delivering high-fidelity music data and that a file corresponding to a piece of music is defined by a three-digit number.

Thus, the telematic server 4 gives the wideband server 1 instructions such as: deliver file 231 on outlet 12; deliver file 056 on outlet 7; stop delivering file 022; deliver file 189 on outlet 13; stop delivering file 206.

In response to these orders from the telematic server 4, the wideband server performs the transfers shown within block 110, which is divided up into the same number of lines as there are outlets served.

Process 1 consists, for example, in filling buffer memory 25A in outlet card 2-1 with the block of data situated at address XXXXXXXXXX of the mass memory.

Process 2 consists in delivering the block of data situated on the hard disk at address YYYYYYYYYY to buffer memory 25A of outlet 2-2.

Process 3 consists in feeding the block of memory situated at address ZZZZZZZZZZ to buffer memory 25B of outlet 2-3. And so on, with process 15 consisting in feeding the block situated at address UUUUUUUUUU to memory 25B on outlet 2-15 and finally process 16 consists in delivering the block situated at address VVVVVVVVVV to memory 25A of outlet 2-16.

It may be observed that the processor 10 communicates with the telematic server 4 only in terms of complete files each of which corresponds to a piece of music.

On the disks, the data is organized in blocks of fixed size, and this size is preferably fairly large, for example 1024 bytes.

In operation, the processor 10 merely increments the block addresses to be read by the DMA channel.

Put briefly, the telematic server sends the following orders:

send piece X to outlet n; and stop piece X.

The wideband server may reply:

piece X is temporarily unavailable; or there is a hardware problem on outlet n.

Figure 4:
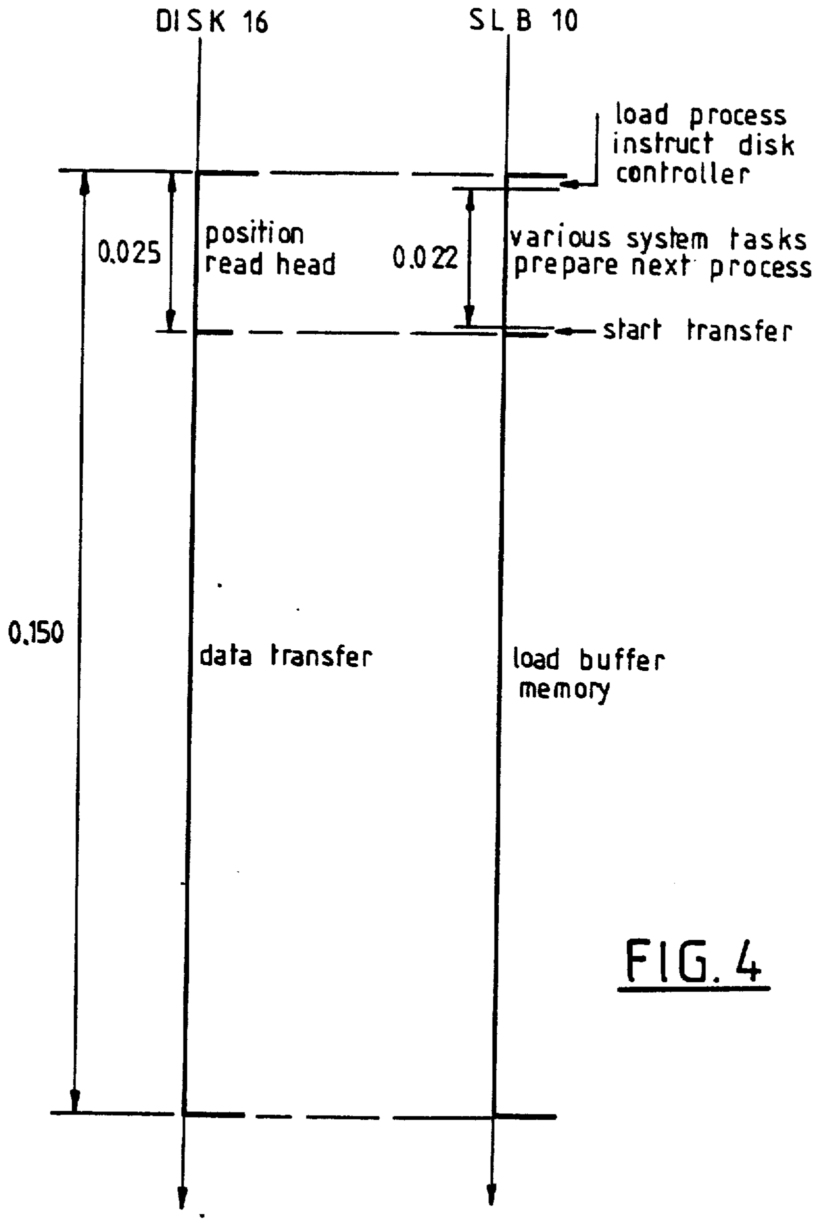
FIG. 4 is a vertical time chart showing how data is transferred between the hard disk and the buffer memory on one of the outlets.

Reference is now made to FIG. 4.

On receiving an order to read a file X, and assuming that all current tasks have been performed, the main processor 10 searches for the physical address of the requested file in the catalog situated at the head of each disk.

The microprocessor 10 then searches for the beginning of file X over a DMA line in order to store it in buffer 25A of the appropriate outlet 2-n.

The processor 10 begins by requesting that the read head of the appropriate hard disk be positioned. Hard disks are now being made having a head positioning time of not more than 25 milliseconds.

The processor 10 will be occupied only during the first two or three milliseconds. There therefore remain 22 milliseconds while the read head is being positioned during which it can perform various system tasks and prepare for the following process.

Shortly before the 25 milliseconds have expired, the processor 10 sends an order to cause transfer to take place from the hard disk 16 to the appropriate outlet 2-n. Since data can be read at 1.96 megabytes per second, and since the processor 10 is clocked at 8 MHz, the person skilled in the art will understand that a buffer memory can be loaded in less than 150 milliseconds, which time includes the time required for positioning the read head of the hard disk.

Figure 5:
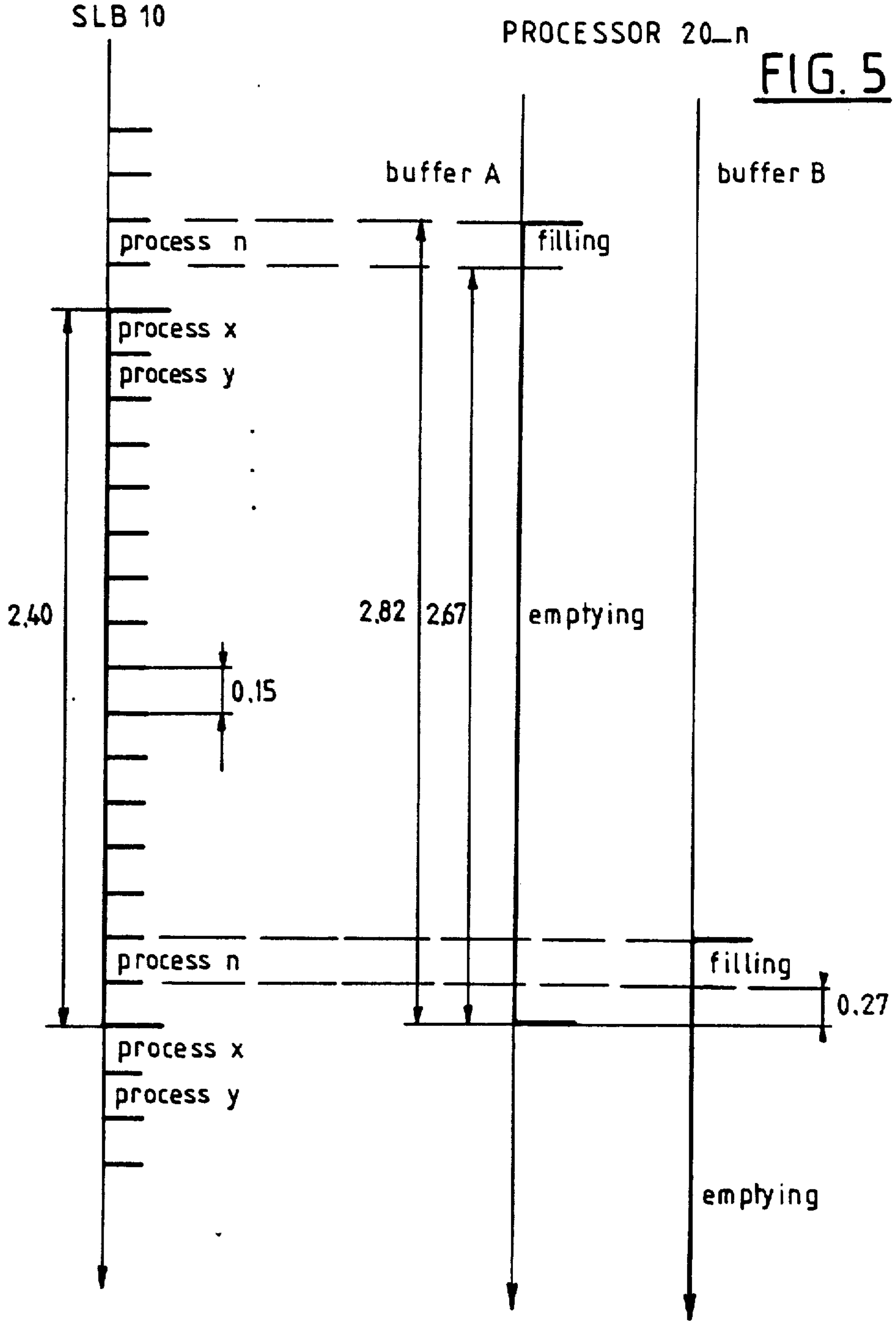
FIG. 5 is a vertical time chart showing the work performed by a server in accordance with the invention in relationship with the two buffer memories belonging to a single

FIG. 5 now shows how the various operations relating to the various outlets are interleaved.

FIG. 3 defines each process to be performed for each outlet.

With reference to FIG. 5, suppose, for example, that process of rank n has been performed to fill memory A of outlet 20-n. Suppose that this is the first filling operation, i.e. that the data concerned the beginning of a music file.

Thereafter, the processor of the wideband server 1 can occupy itself with other processes x and y, and so on each of which occupies it for a period of 0.15 seconds.

After 2.40 seconds have elapsed it will return to process n and this time it will fill memory B of outlet 20-n with the next portion of the music file corresponding to process n.

FIG. 5 shows that this occurs just before memory 25A of outlet 20-n has finished being emptied.

This ensures that the local processor on the corresponding outlet card 2-n is capable of delivering to the user, and in entirely conventional manner, the high-fidelity music data requested by said user.

A buffer memory A takes 2.67 seconds to empty.

If the time required to fill buffer memory A is added in, the total comes to 2.82 seconds.

The time interval between the end of filling memory B and the end of emptying memory A is 0.27 seconds, i.e.: $(2.82-(2.40+0.15))$.

It can also be seen that the process of emptying the buffer memories takes place on an outlet-by-outlet basis under the control of the local processor 20 on each of the outlet cards. This process is thus totally asynchronous.

Further, since the speed at which memory is filled is much higher than the speed at which it is emptied, it is naturally only the local processor 20 on the corresponding outlet card which may authorize filling. This order is given only when the corresponding buffer memory has been emptied. The time during which each sample is processed is 1/32 thousandth of a second. A processor clocked at 8 MHz therefore has 250 cycles at the end of a block in a buffer memory 25A in order to switch over to the beginning of the block in buffer memory 25B.

Naturally, the processor 20 is also required to format the data and to apply appropriate decoding.

Figure 6:
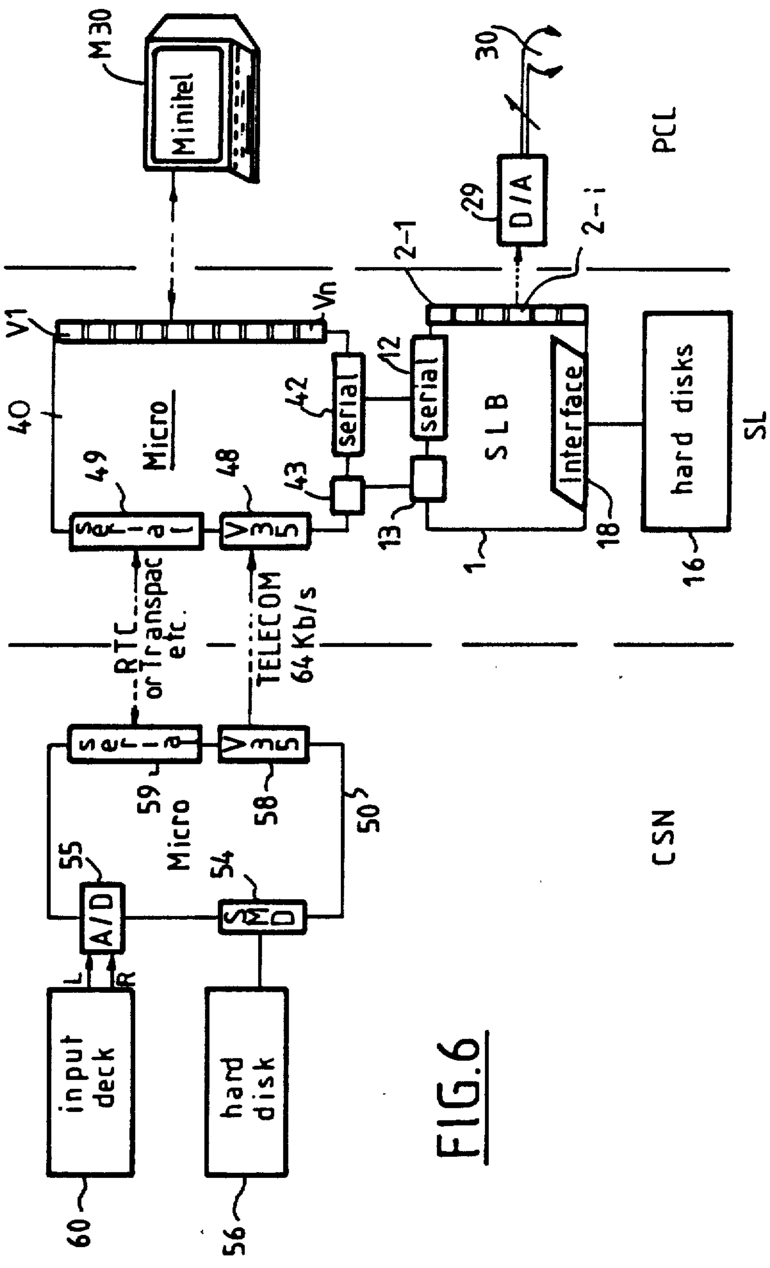
FIG. 6 is a more general block diagram showing a complete installation making use of a wideband server in accordance with the invention.

Reference is now made to FIG. 6.

This figure shows the wideband server 1 whose outlet 2-i is remotely feeding a digital-to-analog converter 29 which delivers music, for example to high-fidelity headphones 30.

The server 1 is communicating with hard disks 16 via the interface 18 which defines the direct memory access channel.

It also communicates via a serial interface 12 and a parallel interface 13 with corresponding interfaces 42 and 43 of the telematic server 40 which may be a conventional multioutlet server for digital data at a normal data rate. Outlets VI to Vn communicate, for example, with Minitels such as M30.

A serial inlet interface 49 and a CCITT interface 48 are also provided.

These two interfaces communicate with corresponding interfaces of a general server center, which may be a single national-level center. It is referred to below as the national server center CSN.

This server center includes a computer whose two-way serial interface 59 communicates with the interface 49, for example by means of the public switched telephone network (PSTN). Its directional interface 58 applies data to the interface 48 at a high rate, for example via a link over the TELECOM 1 satellite, with the data rate being 64 kilobits per second.

The computer 50 has an interface referenced 54 constituting a direct memory access channel for hard disks 56. It also includes an analog-to-digital conversion input 55 suitable for receiving stereophonic music signals over two channels L and R (for left and right) from an input deck 60.

Figure 7:
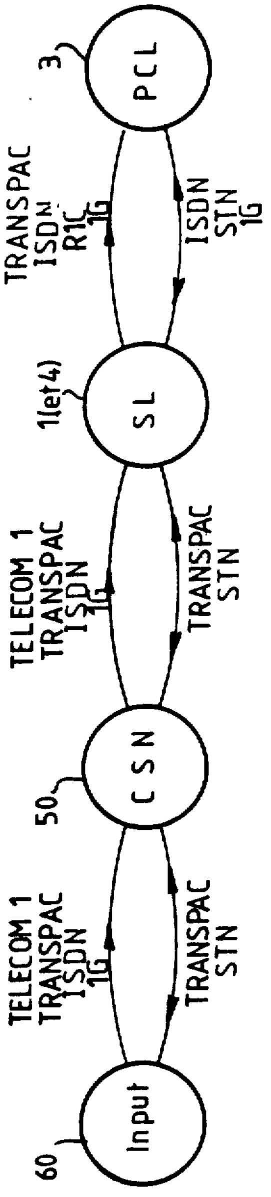
FIG. 7 is a diagram showing the links that may be employed in a complete installation as shown in FIG. 6.

FIG. 7 shows variants. Firstly, the input deck 60 may be remote from the national server center 50. Service information is then transmitted via the TRANSPAC network or over the switched telephone network.

Useful data may be transmitted at a high rate over the TELECOM 1 satellite, via TRANSPAC, via a service integrating digital network, or over a video communications network.

Transmission can thus be performed between the national server center 50 and each of the local servers, each of which combines a wideband server 1 per se, together with an associated telematic server 4.

Finally, the local consultation stations may be located in the same premises as the wideband server 1. However, they may also be remote therefrom. In this case, communication may be provided over an integrated service digital network, over the switched telephone network, or over a video communications network.

The useful musical data may be transferred over an integrated service digital network or over a video communications network.

A particular application of the invention is now described. The input deck 60 may be a conventional hi-fi system for obtaining very high music quality. The converter 55 is suitable for converting stereo at 384 kilobits per second and per channel. At the national server center, the computer 50 records pieces of music on the (very large capacity) hard disk(s) 56 in the form of 64-kilobit frames which are recorded at 384 kilobits per second and per channel. This takes place through the interface SMD.

Simultaneously, a selection data base is updated. This data base is distributed to the local servers over the switched telephone network.

Either systematically or else on demand, the national server center updates the mass memories of the local servers over the one-way link passing via CCITT interfaces (V35 or X21).

Communications taking place in parallel, e.g. over the switched telephone network via the serial interfaces, serve to interchange service information, in particular a record of how much each of the pieces of music stored in the local server have been used since the last transmission. Updates are also performed which may be specific to each local server. The server channel can also provide a degree of remote maintenance.

Naturally, it will often be preferable to transmit new pieces of music to the wideband servers at night so as to leave the system available for other users during the day.

It may be assumed that transmission takes place continuously and simultaneously for all of the local servers. It is thus assumed that the local servers can record continuously.

During this recording stage, control is provided by the wideband server 1 over the V35 or X21 interface of the computer 54 to which it is connected by the parallel interfaces 13 and 43.

In practice, the telematic server receives data block-by-block. It ensures that the parities of the samples are correct and refuses blocks including more than two successive wrong samples. Each of the blocks is naturally designated by a number.

Once a block has been accepted, it may be stored on the local hard disk, while retaining its order number which has no relationship with its physical address on the hard disk.

Only the local operating system knows the physical addresses of pieces of music on the local hard disk.

The wideband server operating system manages the catalog of each of its hard disks, and in particular it keeps account of sectors that may be suffering from hardware problems, which sectors are reported.

The probability of having one erroneous block per session for a transmission of $10^8$ samples is about $10^{-3}$. A very low data rate link is therefore perfectly adequate between the national server center and each telematic server in order to provide corrections.

As mentioned above, each wideband server is solely responsible for the management of its own hard disks. In the event of a write problem it may report the problem, but in any event it will attempt to store the data block that has given rise to the problem somewhere else. Since it is only the operating system which is authorized to write on the hard disk, there is no mutual exclusion problem on the hard disks of wideband servers.

To sum up, the proposed apparatus has an architecture which is distributed both horizontally and vertically. As a result there is no requirement for a colossal data rate at any point of the system.

Data is organized on the hard disks in the form of blocks which are fixed in size and fairly large.

When operating in server mode, the system performs simple operations very quickly, thereby enabling it to serve users with musical data without interruption in complete safety in spite of the fact that this information is processed sequentially in blocks.

The apparatus in accordance with the invention is particularly advantageous for use with the very large capacity hard disks that are now available at reasonable cost (e.g. having a capacity of several hundreds of megabytes).

What is claimed is:

1. An electronic apparatus suitable for constituting a wideband server, in particular for transmitting music or images, comprising in combination:

a main processor possessing a direct memory access channel;

a large capacity mass memory of the hard disk type, connected to said direct memory access channel; and a plurality of outlet units, operatively connected to said direct memory access channel and each possessing two buffer memories of equal capacity and an auxiliary processor operatively connected thereto, said buffer memories being dual-access memories operatively connected to said direct memory access channel and operated in alternating mode by said auxiliary processor to empty said buffer memories in alternation without discontinuity with one of said two buffer memories being read from while the other of said two buffer memories is simultaneously filled at high speed with new data from said large capacity mass memory.

2. An apparatus according to claim 1, wherein said buffer memories have a capacity of 128 kilobytes each, and are controlled by a 16-bit processor clocked at 8 MHz.

3. An apparatus according to claim 1, wherein the main processor is a 16-bit process clocked at 8 MHz, and manages a catalog situated on at least one hard disk of said mass memory, said mass memory having a head positioning time of not more than about 25 milliseconds for a read speed of about 2 megabytes per second, thereby enabling 128 kilobytes to be loaded into one of said buffer memories in less than 0.15 seconds, and consequently enabling 16 of said outlet units to output data without discontinuity, with each of said outlet units delivering their respective data at about 48 kilobytes per second.

4. An apparatus according to claim 1, wherein said outlet units each comprise data decoding means for decoding data read from said buffer memories.

5. An apparatus according to claim 1, further comprising a serial interface, operatively connected to said main processor and to receive data for storage in said mass memory, and wherein said mass memory stores the data received by said serial interface at distributed areas having a size determined by the capacity of said buffer memories.

6. An apparatus according to claim 5, further comprising interface means for receiving data, to be stored in said mass memory, from a general server center over a digital network having a binary data rate of between 64 kilobits per second and two megabits per second.

7. An apparatus according to claim 1, wherein said outlet units are connected to consultation stations to supply at least one of music and images to the consultation stations.

8. An apparatus according to claim 7, further comprising telematic server means for communicating with users via Minitels, enabling a piece of music or a set of images to be selected by the users from said wideband server and supplied to the users via said outlet units.

9. An apparatus according to claim 7, wherein a plurality of the consultation stations can simultaneously receive at least one of musical and video data.

10. An apparatus according to claim 8, wherein a plurality of the consultation stations can simultaneously receive at least one of musical and video data.

11. An apparatus according to claim 5, wherein said outlet data decoding means performs digital-to-analog conversion.

12. An apparatus according to claim 6, wherein the digital network is at least one of a video communications network, an integrated service digital network and a network served by satellite.

13. An apparatus according to claim 7, further comprising telematic server means for communicating with users via computer terminals, enabling a piece of music or a set of images to be selected by users from said wideband server and supplied to the users via said outlet units.

14. An electronic apparatus, comprising:

a main processor;

a direct memory access channel for wideband transmission of data;

a high-speed large capacity mass memory connected to said direct memory access channel; and a plurality of outlet units for receiving the wideband transmission of data via said direct memory access channel, each of said outlet units including at least two dual-access buffer memories, each operatively connected to said direct memory access channel; and an auxiliary processor for controlling access to said dual-access buffer memories so that one of said dual-access buffer memories is receiving data from said direct memory access channel while another of said dual-access buffer memories is inputting data, thereby enabling wideband transmission of data without discontinuity.

* * * * *